United States Patent [19]
Gappa et al.

[11] 3,717,976
[45] Feb. 27, 1973

[54] PROCESS FOR REMOVING SULFUR OXIDES FROM SULFUR OXIDE CONTAINING EXHAUST GAS

[75] Inventors: Gunther Gappa, Gelsenkirchen-Buer; Karl Knoblauch; Franz Maier, both of Essen-Frillendorf; Jurgen Schwarte, Essen Adelgundenweg 65; all of Germany; Peter Steiner, Edison, N.J.

[73] Assignee: Bergwerksverband G.m.b.H., Essen, Germany

[22] Filed: Oct. 22, 1971

[21] Appl. No.: 191,622

[30] Foreign Application Priority Data

Aug. 17, 1971 Germany...................P 21 41 075.3

[52] U.S. Cl..........................................55/73, 55/79
[51] Int. Cl. ................................................B01d 53/06
[58] Field of Search...............55/73, 77, 79, 181, 390

[56] References Cited

UNITED STATES PATENTS

| | | | |
|---|---|---|---|
| 2,992,065 | 7/1961 | Feustel et al. | 55/79 |
| 3,398,509 | 8/1968 | Tamura et al. | 55/77 |

*Primary Examiner*—Charles N. Hart
*Attorney*—Michael S. Striker

[57] ABSTRACT

Process for removing sulfur oxides from water vapor, steam and oxygen containing exhaust gases and in particular from power plant exhaust gases by passing the exhaust gases through a reactor provided with a bed of granular carbon containing material adapted to move in said reactor in a direction from the top to the bottom thereof, which comprises withdrawing a portion of the exhaust gas after it has passed only through the upper part of said reactor, said gas constituting desulfurized gas and allowing the remaining portion of the gas to pass substantially completely through the moving carbon containing granulate bed into the bottom part of said reactor, withdrawing this remaining part of the gas from the bottom part of said reactor and subjecting the same to a further desulfurization treatment.

5 Claims, 1 Drawing Figure

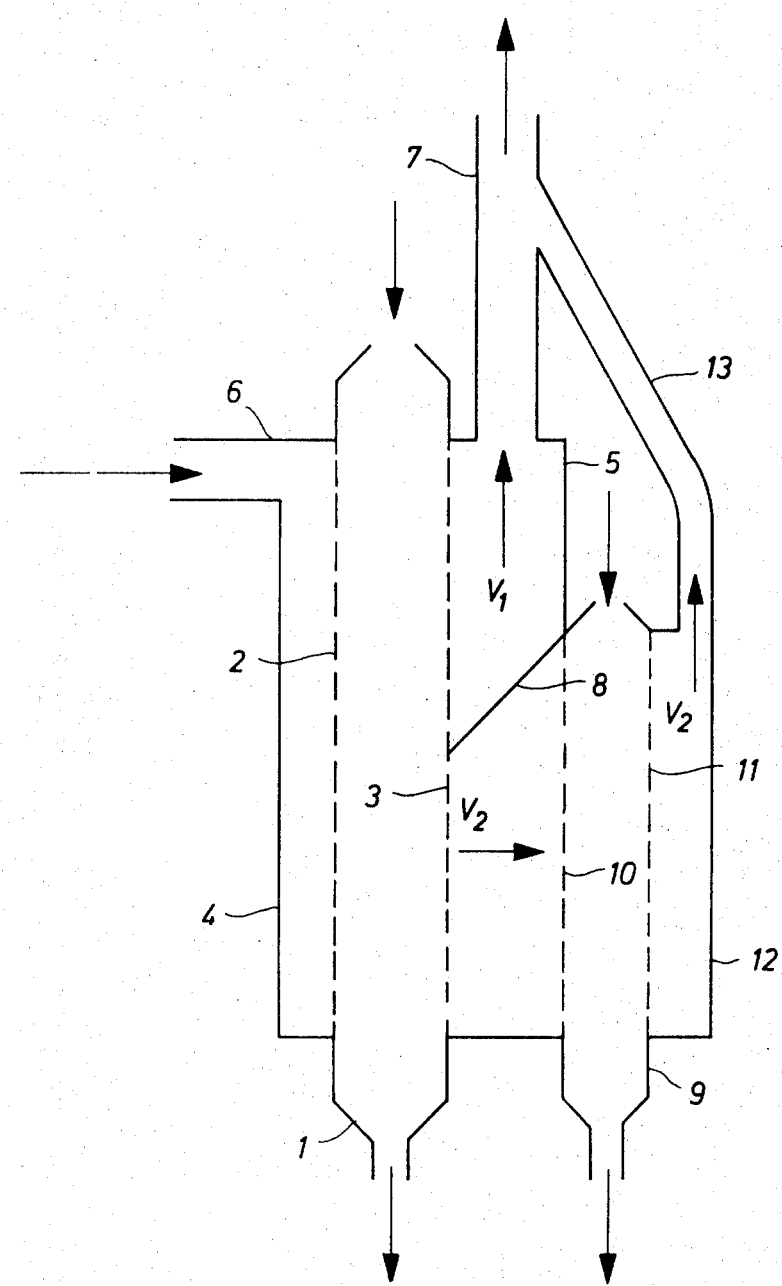

PROCESS FOR REMOVING SULFUR OXIDES FROM SULFUR OXIDE CONTAINING EXHAUST GAS

This invention relates to a process for removing sulfur oxides from water vapor, steam and oxygen containing exhaust gases and in particular from furnace exhaust gases utilizing therefor reactors through which layers of granular carbon containing materials are moved in a direction from top to bottom and through which the exhaust gases are flowed in a direction perpendicular to the direction of motion of the carbon containing granules.

It is already known to remove sulfur oxides from exhaust gases by utilizing techniques involving adsorption onto granular carbon containing materials and in particular to utilize special cokes and active carbons in connection with which the adsorption material is conducted through a tower in a direction moving from the top vertically or obliquely to the bottom and at the bottom end of the tower by means of a sluice device removing the granular material. The exhaust gas is flowed into the tower and through the moving granules in a direction of movement transverse to that of the moving granular bed. The adsorption material discharged from the reactor is in accordance with known processes treated for removing of the sulfur oxides therefrom generally in the form of sulfuric acid and after such regeneration and following replenishment with fresh material reintroduced into the circulation.

The object of this invention is to improve the process for adsorption of sulfur oxide onto granular carbon containing material by lowering the amount of the adsorption material required to produce a constant average degree of desulfurizing in the exhaust gas.

It is another object of the invention to improve the process for adsorption of sulfur oxides onto granular carbon containing material by increasing the sulfur oxide loading of the adsorption material.

These and other objects and advantages are obtained in accordance with the invention in that a portion of the exhaust gas which has been introduced into the reactor for the desulfurization thereof is taken off after it has passed only through the upper part of the reactor, removing the remaining gas only after its passage transversely through the moving bed of carbon containing adsorption material after it has reached the bottom part of the reactor and subjecting this latter portion of gas to an after desulfurization treatment, preferably in a second moving bed reactor.

The process of the invention provides the possibility whereby the average sulfur oxide loading of the granular adsorption material can be essentially increased and therewith there is provided a better utilization of the adsorption material.

There can advantageously be provided in order to obtain even better results, one or more reactors which operate in the same manner as the first reactor between the first reactor and the after installed second desulfurization reactor. The gas taken off from the top part of each of these reactors being considered as desulfurized gas and the gas drawn off from the bottom part of each of the after installed reactors being introduced into a subsequently installed desulfurization reactor.

By dividing the exhaust gas stream, good yields are obtained in that in accordance with the invention the portion of the gas which is taken off at the upper part of the reactor amounts to 30 – 90 volume percent of the total gas stream. The exact volume percent which is taken off at the top part of the reactor is adjusted essentially in accordance with the sulfur oxide content of the exhaust gases, its flow velocity, the adsorption capability of the adsorption material and its rate of movement as well as the diameter of the moving bed. In each case the separation point which establishes the upper and bottom portions of the reactor is so selected that an exhaust gas having the desired desulfurization degree is taken off from the upper part of the reactor. Correspondingly, the height of the upper part of the reactor can amount to 30 – 90 percent and preferably 40 – 70 percent of the total height of the moving bed.

In the desulfurization of the exhaust gas, as carried out in the further desulfurization stages there can be obtained different sulfur oxide exit concentrations in the individual desulfurization stages. In this case a constant average desulfurization degree can be obtained if in accordance with the invention, the desulfurized exhaust gas streams are fed into a common collecting conduit where they are intermixed prior to discharge.

The process of the invention will be further explained by reference to the drawing forming a part of this disclosure and showing the process of the invention utilizing two adsorber reactors.

According to the drawing, the tower 1 has its two opposing walls 2 and 3 in the form of perforated walls. The walls are enclosed by means of casing or frame members 4 and 5, the tower being provided with a gas inlet and gas outlet 6 and 7 respectively. The adsorption material moves through the tower 1 in a direction extending from the top to the bottom thereof. The exhaust gas is flowed through the inlet 6 and the perforated wall 2 and then downwardly through the moving bed of adsorption material, a portion of the gas being taken off at the top of the tower and this being discharged via second perforated wall 3 provided in the casing 5.

Inside the casing 5 there is located a dividing wall 8 by means of which the exhaust gas flowing through the perforated wall 3 is divided up into two streams. The exhaust gas stream $V_1$ is diverted from the upper part of the tower 1 by means of the dividing wall 8 and directly introduced into the gas outlet 7 while the exhaust gas stream $V_2$ exiting from the bottom of the tower 1 is led from the casing 5 for introduction into the second tower 9 forming a part of the after desulfurization apparatus and which second tower is similarly provided with two opposed perforated walls 10 and 11 and a casing 12. The gases leave the tower 9 through wall 11 and pass out through tube 13. There is also provided in tower 9 as in tower 1 a moving body of adsorption material, the same again moving in a direction from the top to the bottom of the tower. The exhaust gases leave the tower 9 through the perforated wall 11, enter the casing 12 and are led via gas discharge tube 13 into the gas outlet 7.

The following Examples are given in order to more fully illustrate the invention, the same are, however, in no wise to be construed as limiting the scope thereof.

EXAMPLE 1

An exhaust gas in an amount of 100,000 and Nm³/hr. derived from a coal power plant having a sulfur oxide concentration of 2,000 ppm and an exhaust gas temperature of 125°C is introduced in a first step into a reactor containing 238 m³ of a molded coke adsorption agent forming a moving layer in the reactor. Seventy percent Of the thusly introduced flue gas is taken off from the top part of the reactor. Its desulfurization degree amounts to 90 percent. The remaining 30 percent of the flue gas is taken off at the bottom of the reactor and introduced into a second moving bed reactor having an adsorption volume of 67 m³. The exiting gas from the second reactor is also desulfurized to a degree of 90 percent.

The gas dwell time in the first moving bed reactor amounts to 6 seconds, the molded coke moving bed dwell time amounts to 20 hours and the sulfur oxide loading of the coke to 6.1 percent sulfur oxide. In the second step, with a gas dwell time of 4 seconds and a coke dwell time of 40 hours a sulfur oxide loading of 8.5 weight percent sulfur oxide is obtained.

The total volume of the first and second steps amounts to 305 m³. The average sulfur oxide loading amounts to 6.8 weight percent sulfur oxide, the average coke dwell time to 26 hours and the total desulfurization degree to 90 percent.

In comparison, the same amount of exhaust gas having a sulfur oxide concentration of 2,000 ppm and a temperature of 125°C under use of a single moving bed reactor with a carbon containing adsorption agent for providing a desulfurization to an extent of 90 percent required an adsorption volume of 500 m³ coke in which connection the coke dwell time amounted to 26 hours in the moving bed reactor. The average sulfur oxide loading of the carbon containing material amounted to only 4 weight percent.

EXAMPLE 2

An exhaust gas in an amount of 100,000 Nm³/hr. derived from an oil fired power plant and having a sulfur oxide concentration of 2,000 ppm and an exhaust gas temperature of 150°C was introduced into the first stage of the moving bed reactor having a 160 m³ capacity. Fifty percent of the thusly delivered flue gas was taken off at the top part of the reactor. Its desulfurization degree amounted to 90 percent. The remaining 50 percent of the flue gas was taken off from the bottom of the reactor and introduced into a second moving bed reactor having an adsorption volume of 70 m³. The exhaust gas from this second stage was so divided that 30,000 Nm³/hr. of gas was taken off from the upper part of the reactor and directly discharged while the remaining 20,000 Nm³/hr. was taken off from the bottom part of the reactor and introduced into a third moving bed reactor having a capacity of 40 m³ for further desulfurization. The gas exiting from the third stage and amounting to 20,000 Nm³/hr. was admixed with the gas exiting from the third stage and amounting to 50,000 Nm³/hr. and that from the second stage amounting to 30,000 Nm³/hr. The desulfurization degree of admixed exhaust gases amounted to 95 percent. At an average coke dwell time of 26 hours, an average loading of 8.1 weight percent sulfur oxide was obtained.

In comparison, the same amount of exhaust gas having a sulfur oxide concentration of 2,000 ppm and a temperature of 150°C, under use of a single stage reactor provided with a carbon containing adsorption agent, required to produce a desulfurization degree of 95 percent, an adsorption volume of 600 m³ coke with a dwell time of 36 hours in the moving layer reactor. The average sulfur oxide loading of the carbon containing material in this case amounted to 3.3 weight percent sulfur oxide.

We claim:

1. Process for removing sulfur oxides from water vapor, steam and oxygen containing exhaust gases by passing the exhaust gases in a transverse direction through a reactor provided with a bed of granular carbon containing material, said bed moving in said reactor in a direction from the top to the bottom thereof, which comprises withdrawing a first portion of said exhaust gas after it has passed only through the upper part of said reactor and said bed, said gas constituting desulfurized gas, allowing the remaining portion of said exhaust gas to pass transversely through the moving bed of carbon containing material in the bottom part of said reactor, withdrawing this latter part of exhaust gas and subjecting the same to an after desulfurization treatment.

2. Process according to claim 1, wherein said desulfurization treatment is carried out in a second moving bed reactor.

3. Process according to claim 2, which comprises arranging at least one further reactor which operates similarly to said first reactor between said first and second reactor whereby gas is withdrawn from the top portion of each of said reactors as desulfurized gas and wherein the gas withdrawn from the bottom part of each of said reactors is introduced into an after arranged reactor for further desulfurization.

4. Process according to claim 1, wherein the portion of the gas taken off at the upper part of the reactor amounts to 30–90 volume percent of the total gas introduced therein.

5. Process according to claim 2, wherein desulfurized gas formed in each of said reactors is introduced into a common collecting conduit for admixture therein to provide a constant average desulfurization degree.

* * * * *